United States Patent
O'Shea (10) Patent No.: US 7,065,157 B2
(45) Date of Patent: Jun. 20, 2006

(54) GMSK MODULATION TECHNIQUES

(75) Inventor: Helena Deirdre O'Shea, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 257 days.

(21) Appl. No.: 10/387,187

(22) Filed: Mar. 11, 2003

(65) Prior Publication Data

US 2004/0179630 A1  Sep. 16, 2004

(51) Int. Cl.
*H04L 27/12* (2006.01)

(52) U.S. Cl. ............... 375/305; 375/274; 375/336; 332/100; 332/101; 332/102; 332/103

(58) Field of Classification Search ........... 375/305, 375/222, 274, 308, 336, 298, 302, 223; 332/101, 332/100, 103, 102
See application file for complete search history.

(56) References Cited

U.S. PATENT DOCUMENTS

| 4,686,688 | A | * | 8/1987 | Chung et al. ............... 375/274 |
| 5,121,412 | A | * | 6/1992 | Borth ........................ 375/308 |
| 5,627,499 | A | * | 5/1997 | Gardner ..................... 332/101 |

FOREIGN PATENT DOCUMENTS

| EP | 0388381 A1 | * | 9/1990 |
| EP | 0494696 A2 | * | 7/1992 |

* cited by examiner

*Primary Examiner*—Stephen Chin
*Assistant Examiner*—Ted M. Wang
(74) *Attorney, Agent, or Firm*—Philip R. Wadsworth; Charles D Brown; George C Pappas (57) ABSTRACT

This disclosure is directed to digitally implemented GMSK modulation techniques. The digital GMSK modulation techniques make use of a lookup table (LUT) and mapping logic to digitally generate GMSK waveforms. The mapping logic can significantly reduce the size of the LUT, and thereby reduce memory requirements needed for effective digitally implemented GMSK modulation.

32 Claims, 4 Drawing Sheets

GMSK MODULATION TECHNIQUES

TECHNICAL FIELD

The invention relates to wireless communication, and more particularly to wireless communication systems that implement Gaussian minimum shift keying (GMSK) modulation.

BACKGROUND

A wide variety of wireless communication techniques have been developed to facilitate wireless telecommunication. In this disclosure, a wireless communication device (WCD) refers to any device that can modulate wireless signals as described in greater detail below. Some example WCDs include cellular or satellite radiotelephones, radiotelephone base stations, computers that support one or more wireless networking standards, wireless access points for wireless networking, PCMCIA cards incorporated within portable computers, direct two-way communication devices, personal digital assistants (PDAs) equipped with wireless communication capabilities, and the like.

In wireless telecommunication, information is modulated to create one or more baseband waveforms (also referred to as baseband signals). The baseband waveforms may then be mixed with an electromagnetic carrier wave (sometime referred to as an up-conversion process), and the carrier wave mixed with the modulated baseband waveform can be wirelessly transmitted to a receiving device. The receiving device mixes the baseband waveform from the received carrier wave (sometimes referred to as a down-conversion process). Demodulation of the baseband waveform can then be performed by the receiving device to obtain the modulated information.

A number of different modulation techniques have been developed for modulating information in order to facilitate wireless communication. One modulation technique commonly used in telecommunication systems is referred to as Gaussian minimum shift keying (GMSK) modulation. GMSK modulation is a binary modulation scheme that can be viewed as a derivative of minimum shift keying (MSK) modulation. MSK modulation is a type of continuous phase frequency shift keying (CPFSK) with a modulation index corresponding to the minimum frequency spacing that allows two FSK signals to be coherently orthogonal.

In GMSK, the sidelobe levels of the MSK modulated waveform are further reduced, e.g., by passing the waveform through a Gaussian filter. Gaussian filtering can smooth the phase trajectory of the MSK modulated signal and stabilize instantaneous frequency variations over time. In addition, the Gaussian filtering typically causes intersymbol interdependence in the waveform, e.g., making the value of one symbol dependent on the values of other symbols. GMSK modulation is an attractive candidate for wireless telecommunication because it generally exhibits excellent power efficiency and excellent spectral efficiency.

For example, GMSK modulation has been used in digital cellular communication standards including the global system for mobile communications (GSM) standardized by the European Telecommunication Standards Institute (ETSI). In addition, GMSK modulation has been used in various wireless networking systems, as well as other telecommunication systems.

SUMMARY

In general, this disclosure is directed to digitally implemented techniques for Gaussian minimum shift keying (GMSK) modulation. The digital modulation techniques make use of a lookup table (LUT) and mapping logic to digitally generate GMSK waveforms. As described in detail below, the mapping logic can significantly reduce the size of the LUT, and thereby reduce memory requirements needed for effective digital implementation of GMSK modulation.

In one embodiment, this disclosure provides a method implemented by a digital GMSK modulator of a wireless communication device. The method may comprise selecting a first GMSK waveform from a LUT based on a first subset of an input bit stream, and inverting the first GMSK waveform to generate a second GMSK waveform. The method may further comprise selecting between the first and second GMSK waveforms based on a second subset of the input bit stream.

The details of one or more embodiments are set forth in the accompanying drawings and the description below. Other features, objects, and advantages of this disclosure will be apparent from the description and drawings, and from the claims.

DETAILED DESCRIPTION

This disclosure is directed to techniques for digital implementation of Gaussian minimum shift keying (GMSK) modulation. In GMSK, the sidelobe levels of a minimum shift keying (MSK) modulated waveform are reduced, e.g., by conventionally passing the waveform through a Gaussian filter. Such Gaussian filtering can smooth the phase trajectory of the MSK modulated signal and stabilize instantaneous frequency variations over time. In accordance with this disclosure, however, waveforms can be digitally generated. In particular, GMSK waveforms may be pre-stored and selected from a lookup table (LUT), based on an input bit stream. The input bit stream represents a signal to be modulated by the digital GMSK modulation techniques described herein, and may also be differentially encoded, e.g., in accordance with the global system for mobile communications (GSM) standard.

Conventional Gaussian filtering of an MSK modulated waveform causes intersymbol interdependence in the waveform, e.g., making the value of one symbol depend on the values of other symbols. In accordance with this disclosure, a current bit and the previous four bits may be input as indices to either a LUT or mapping logic in order to introduce intersymbol interdependence similar to that introduced by a Gaussian filter.

Moreover, redundancy in the GMSK modulation scheme can be exploited such that only a subset of the total number of possible GMSK waveforms are stored in the LUT. The mapping logic can be used to invert output of the LUT, and then select either the direct output or inverted output of the LUT as the GMSK waveform. In some cases, additional mapping may be performed by the mapping logic in order to identify the selected GMSK waveform as either a real or imaginary component. In these ways, the size of the LUT needed for effective digital GMSK modulation can be significantly reduced. For example, the technique of inverting output of the LUT, and then selecting between the directed and inverted outputs of the LUT can reduce memory requirements of the LUT by one-half.

A first subset of the input bit stream may be input to the LUT, and a second subset of the input bit stream may be input to the mapping logic. Collectively, the LUT and mapping logic can identify and select an appropriate output waveform that has intersymbol interdependence similar to what would be achieved if a conventional Gaussian filter were applied to an MSK waveform. The described techniques can eliminate the need for an analog Gaussian filter, and can significantly reduce memory requirements relative to a digital modulation scheme that stores every possible GMSK output waveform in the LUT.

Figure 1:
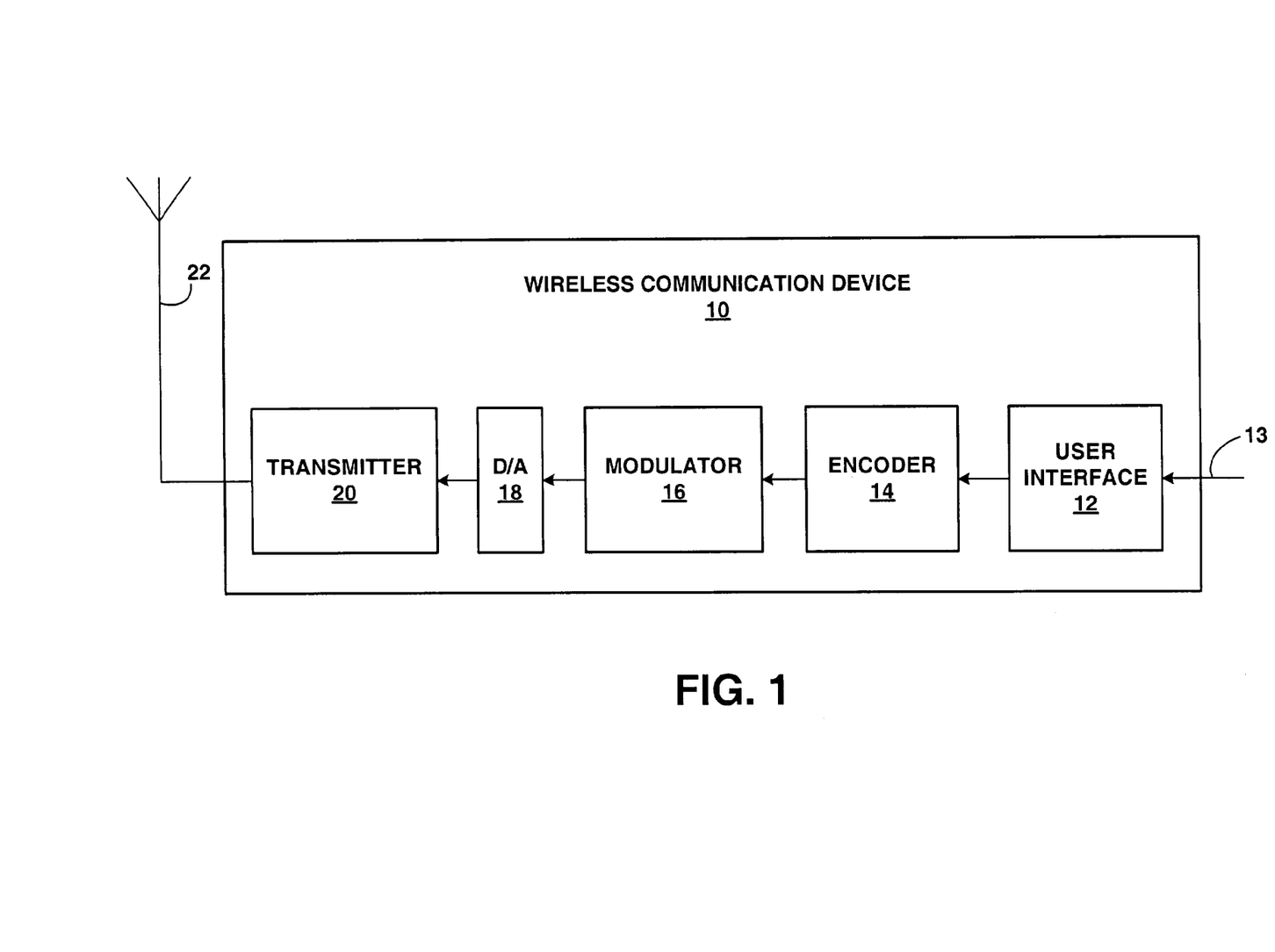
FIG. 1 is a block diagram illustrating an exemplary wireless communication device (WCD) that includes a digital Gaussian minimum shift keying (GMSK) modulator.

FIG. 1 is a block diagram illustrating an exemplary wireless communication device (WCD) 10. In this disclosure, a WCD refers to any device that can modulate and transmit wireless signals as described herein. For example, WCD 10 may correspond to a cellular or satellite radiotelephone, a computer that supports one or more wireless communication device, a person digital assistant (PDA) equipped with wireless communication capabilities, or the like. In addition, WCD 10 may also correspond to a radiotelephone base station, sometimes referred to as a base transceiver system, or BTS, a wireless access point for wireless networking, or other devices that communicate with radiotelephones or wireless computers.

As shown in FIG. 1, WCD 10 includes a user interface 12 that receives input 13, e.g., from a user or another source. Input 13, for example, may comprise voice or data information, video information, or any other information for which it is desirable to encode, modulate and wirelessly transmit the information. Encoder 14 receives information from user interface 12 and encodes the information, e.g., as a digital stream of ones and zeros. Encoder 14 may include an analog-to digital converter to generate digital streams based on an analog signal produced by user interface 12. Encoder 14 may include additional source encoding capabilities to mitigate the deleterious effects of the propagation channel.

Modulator 16 receives the encoded bit stream from encoder 14, and performs digital GMSK modulation as described herein. In particular, as outlined in greater detail below, modulator 16 may select a first GMSK waveform from a lookup table (LUT) based on a first subset of an input bit stream received from encoder 14, invert the first GMSK waveform to generate a second GMSK waveform, and select between the first and second GMSK waveform based on a second control signal which is generated from a subset of the input stream. Modulator 16 may include a LUT (not shown in FIG. 1) that stores only a subset of possible GMSK waveforms. Modulator 16 may also include mapping logic (not shown in FIG. 1) to generate other possible waveforms from the selections from the LUT, and select the desired GMSK output waveform for each given symbol.

The output GMSK waveform generated by modulator 16 may comprise over-sampled digital waveforms, referred to as digital baseband signals. The digital baseband signals can be sent to digital-to analog converter (D/A) 18 for conversion to an analog signal. The generated analog GMSK waveforms, referred to as an analog baseband signal, can then be sent from D/A converter 18 to transmitter 20. Transmitter 20 mixes the analog baseband signal on a carrier, e.g., using a local oscillator (LO) of WCD 10 as a timing reference. Various filtering, scaling, or other signal conditioning may also be performed by transmitter 20 before transmitting the carrier mixed with the GMSK waveform via radio frequency antenna 22. Transmitter 20 implements a wireless communication protocol to send the signals.

WCD 10 may also include a separate control unit (not shown) that coordinates one or more of the encoding, modulation and wireless transmission. In any event, WCD 10 digitally modulates GMSK signals, and transmits signals according to a wireless communication protocol. For example, the wireless communication protocol may be based on code division multiple access (CDMA), frequency division multiple access (FDMA), time division multiple access (TDMA), various combinations thereof, or the like.

Figure 2:
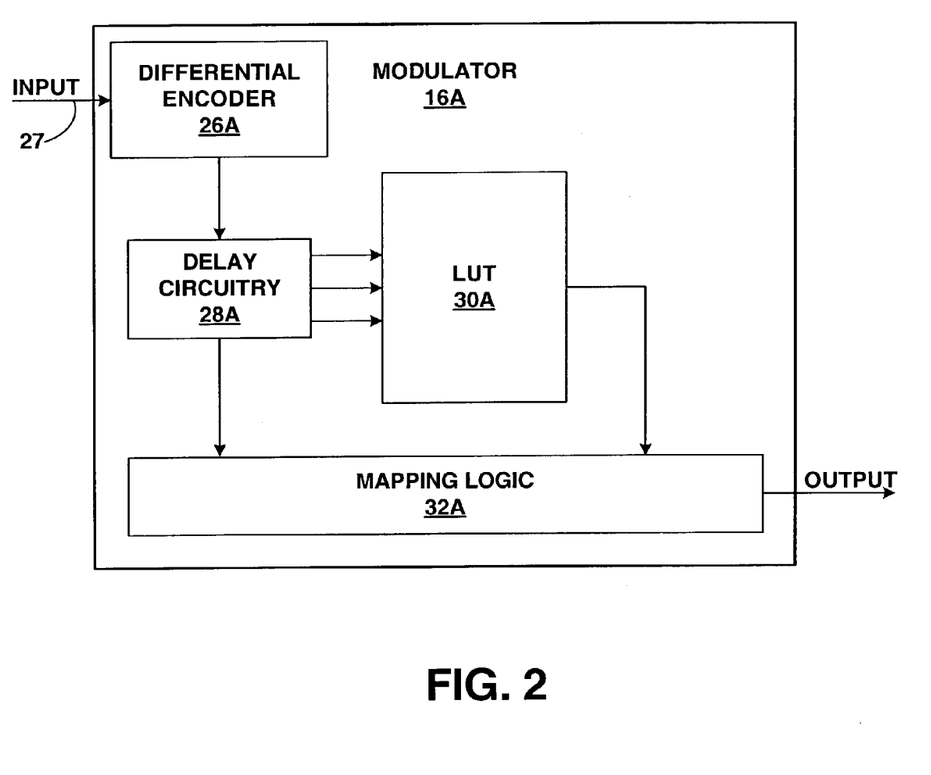
FIG. 2 is a block diagram illustrating an exemplary GMSK modulator in greater detail.

FIG. 2 is a block diagram illustrating an exemplary GMSK modulator 16A in greater detail. Modulator 16A may correspond to modulator 16 of FIG. 1. As illustrated in FIG. 2, modulator 16A includes a differential encoder 26A, delay circuitry 28A, a lookup table (LUT) 30A and mapping logic 32A.

Differential encoder 26A receives an input bit stream 27, and differentially encodes bit stream 27. The differentially encoded bit stream is received by delay circuitry 28A, which provides samples to LUT 30A and mapping circuitry 32A in a delayed and coordinated manner. In particular, delay circuitry 28A can be designed to provide a first subset of the bit stream to LUT 30A and a second subset of the bit stream to mapping logic 32A. By properly clocking the bit stream and providing input to LUT 30A and mapping circuitry 32A in a coordinated fashion, the correct address to the LUT can be determined. In addition, the subsets used as input to LUT 30A and mapping logic 32A may be defined so that mapping logic 32A works in tandem with LUT 30A such that redundancy in the GMSK modulation scheme can be exploited. By exploiting such redundancy in the GMSK modulation scheme, the size of LUT 30A can be significantly reduced, thereby reducing memory requirements needed for effective digital implementation of GMSK modulator 16A.

A first GMSK waveform can be selected from LUT 30A based on the first subset of the differentially encoded input bit stream. Mapping logic 32A may invert the first GMSK waveform to generate a second GMSK waveform, and a control signal can then select the appropriate output between the first and second GMSK waveforms based on a second subset of the input bit stream which is based on whether the current input sample is an even numbered sample or an odd number sample. In other words, mapping logic 32A exploits redundancy in the GSMK modulation scheme by generating the inverse waveform of that selected from LUT 30A. The first subset of the input bit stream is used by LUT 30A to select the first GMSK waveform, and the second subset of the input bit stream is used by mapping logic to select between the first and second GMSK waveforms. Accordingly, the size of LUT 30A can be reduced relative to techniques that feed the whole input bit stream to a LUT to generate the desired waveform.

Mapping logic 32A selects the correct output GMSK waveform, i.e., the desired baseband signal or a real or imaginary component of the baseband signal, from the GMSK waveform selected from LUT 30A and the inverse of the selection from LUT 30A. Accordingly, LUT 30A only needs to store half of the possible GMSK waveforms, and the other half can be generated as inverses of respective GMSK waveforms stored in LUT 30A. Following selection of the output waveform from the direct and inverted output of LUT 30A, mapping logic 32A may also map the output waveform as a real or imaginary component, e.g., of a complex waveform.

In some cases, a plurality of first GMSK waveforms can be selected from LUT 30A based on the first subset of the input bit stream. In that case, mapping logic 32A inverts each of the first GMSK waveforms to generate a plurality of second GMSK waveforms. Mapping logic 32A then selects outputs between the plurality of first GMSK waveforms and the plurality of second GMSK waveforms based on the second subset of the input bit stream. In that case, the outputs may correspond to real (I) and imaginary (Q) components of a complex waveform corresponding to a desired baseband signal. Mapping logic 32A may then map the selected outputs to the respective real (I) and imaginary (Q) components of the complex waveform.

Mapping logic 32A may generate one or more control signals for selecting output between the first GMSK waveform and the second GMSK waveform. If a plurality of first and second waveforms are selected by LUT 30A and generated by mapping logic 32A, the mapping logic may generate control signals for selecting outputs from the plurality of first GMSK waveforms and the plurality of second GMSK waveforms. In either case, mapping logic 32A can generate the control signals based on the second subset of the input bit stream provided to mapping logic 32A by delay circuitry 28A. Again, the input bit stream is broken into first and second subsets in order to facilitate use of a portion of the input bit stream by LUT 30A and use of another portion of the input bit stream by mapping logic 32A. In particular, in one implementation, the first subset of the input bit stream includes the current symbol and the previous three symbols, whereas the second subset includes the current symbol and the symbol that precedes the current symbol by four cycles. Many other implementations, however, using different combinations of the input bit stream could also be used.

The GMSK signal model defined by the GMSK standard is:

$$s(t) = \sqrt{\frac{2E_c}{T}} \cos(2\pi f_c t + \Phi(t) + \theta), \qquad \text{EQUATION (1)}$$

where s(t) represents the transmitted analog signal at the antenna, $E_c$ is the energy per symbol, T is the symbol duration, $f_c$ is the carrier frequency, t is time, Θ(t) is the GMSK phase modulation, and θ is the random phase from the guard band and is constant during one burst.

A burst is typically defined to include 148 bits (also referred to as symbols), as well as guard intervals before and after the active part of the burst as defined in the GSM standard. The guard intervals may comprise a stream of ones prior to the burst and following the burst. The GSM standard does not specify anything about the phase of the modulator during the guard intervals. However, the data during the guard intervals is specified by the GSM standard as being a stream of binary 1's. The guard intervals may be equivalent to 8.25 bits, in duration.

When adjacent slots are not being used, e.g., when the wireless device enters different modes of operation, then power ramp-up and power ramp-down profiles may be associated with a time slot. A relatively long stream of 1's may be generated by the modulator prior to the 148 bit burst to define power ramp-up, and another stream of 1's may be generated following the 148 bit burst to define power ramp-down. These power ramp-up and power ramp-down streams of 1's are part of the guard intervals.

The GMSK modulating phase Θ(t) is defined as $$\Phi(t) = \pi h \sum_i \alpha_i \int_{-\infty}^{t-iT} g(x)\, dx \qquad \text{EQUATION (2)}$$

where h is the modulation index, the NRZ bit to be modulated at time iT is denoted as $\alpha_i$, and the Gaussian pulse shaping is denoted as g(x), where x is a dummy integration variable. For ease of notation, hereafter, the integration term above is denoted as q(t).

The integration term q(t) can be defined into three subsections assuming that the portion of q(t) that is of interest is in the range of [−2T, 2T]. Moreover, these limits can change based on how much phase error the designer wants to have the modulator design contribute at the antenna:

$$q(t) \cong \begin{cases} 0 & t < -2T \\ q(t) & -2T \leq t \leq 2T \\ 1 & t \geq 2T \end{cases} \qquad \text{EQUATION (3)}$$

where q(t) represents the integral of the Gaussian shaping filter, t is time, and T is the symbol duration of the modulating data source.

The phase of the GMSK modulating signal defined previously in Equation (1) is $$\Phi(t) = \pi h \sum_i \alpha_i q(t - iT) \qquad \text{EQUATION (4)}$$

where h is the modulation index which for GSM is equal to 0.5, and the NRZ data stream is denoted as α.

By substitution of the identity defined in EQUATION (3), EQUATION (4) can be rewritten as:

$$\Phi(t, \vec{\alpha}) = \pi h \left[ \sum_{i=-\infty}^{n-2} \alpha_i + \sum_{i=n-1}^{n+2} \alpha_i q(t - iT) \right] \qquad \text{EQUATION (5)}$$

$$nT \leq t \leq (n+1)T$$

which after sampling at a rate mT and using h=0.5 can be elaborated as:

$$\Phi(mT, \alpha) \approx \frac{\pi}{2}\left\{\sum_{i=-\infty}^{n-2}\alpha_i + \sum_{i=n-1}^{n+2}\alpha_i q(mT-iT)\right\}, \quad \text{EQUATION (6)}$$

The modulated output can be re-written in the following format without any loss of accuracy:

$$\exp(j\Theta(mT,\alpha))=[a_n c_n(mT)-b_n c_n(mT)]+j[b_n c_n(mT)+a_n c_n(mT)], \quad \text{EQUATION (7)}$$

where, $$a_n + jb_n = \exp\left(j\frac{\pi}{2}\sum_{i=-\infty}^{n-2}\alpha_i\right), \text{ and} \quad \text{EQUATION (8)}$$

$$C_n(mT) + js_n(mT) = \exp\left(j\frac{\pi}{2}\sum_{i=n-1}^{n+2}\alpha_i q(mT-iT)\right). \quad \text{EQUATION (9)}$$

The value $c_n$ represents the cosine function with respect to the $n^{th}$ symbol and $s_n$ represents the sine function with respect to the $n^{th}$ symbol in EQUATION (9). Similarly, for EQUATION (8), $a_n$ represents the cosine component of the expression and $b_n$ represents the imaginary component.

The $a_n$ and $b_n$ terms can be computed recursively as:

$$a_n = -\alpha_{n-2} b_{n-1}, \text{ and} \quad \text{EQUATION (10)}$$

$$b_n = \alpha_{n-2} a_{n-1} \quad \text{EQUATION (11)}$$

This follows from:

$$\sum_{i=-\infty}^{n-2}\alpha_i = \alpha_{n-2} + \sum_{i=-\infty}^{n-3}\alpha_i \quad \text{EQUATION (12)}$$

The initial conditions for the loop are $a_{-1}=0$ and $b_{-1}=1$. The second term of EQUATION (12) can be constructed using combinatorial logic. In EQUATION (9) the cosine and sine terms can be stored in a lookup table (LUT), the index into the LUT without any simplifications would be 4-bits wide, i.e., $\alpha_{n-1}, \alpha_n, \alpha_{n+1}, \alpha_{n+2}$. Then, for each element of this 4 bit alphabet size there would be a sequence of output samples corresponding to the oversampled output of the GMSK modulator. However, these 4-bits can be reduced to 3-bits in the LUT by factoring one term, in this example $\alpha_{n+2}$. Thus, $$c_n(iT) = \cos\left\{\frac{\pi}{2}q(-2T-nT) + \frac{\pi}{2}\sum_{i=0}^{2}\alpha_{n+i}\alpha_{n+2}q(-iT+nT)\right\}, \text{ and} \quad \text{EQUATION (13)}$$

$$s_n(iT) = \alpha_{n+2}\sin\left\{\frac{\pi}{2}q([-2T-nT) + \frac{\pi}{2}\sum_{i=0}^{2}\alpha_{n+i}\alpha_{n+2}q(-iT-nT)\right\}$$
$$= \alpha_{n+2}s'_n(iT), \text{ or:} \quad \text{EQUATION (14)}$$

$$s_n(iT) = \alpha_{n+2}s'_n(iT) \quad \text{EQUATION (15)}$$

The values $d_i$ would typically be used rather than $\alpha_i$ where d=0 when $\alpha=1$, and d=1 when $\alpha=-1$. In other words, $d_i$ and $\alpha_i$ generally represent the same information, with d assuming valued of 1 and 0 and $\alpha$ assuming values of 1 and -1, consistent with the GSM standard.

Given that the phase during the guard interval is generally irrelevant, the initial conditions of a burst are $c_1=1$, $s_{-1}=0$, which gives $c_0=0$, $s_0=-1$. After substituting for $s_n$ and $c_n$ for the case where the LUT is 3-bits wide, and reducing EQUATION (7), the following can be obtained:

for even numbered symbols:

$$\exp j\Theta(t)=a_n c_n(iT)+j(a_n\alpha_{n+2})s'_n(iT), \text{ and} \quad \text{EQUATION (16)}$$

for odd numbered symbols:

$$\exp j\Theta(t)=(-b_n\alpha_{n+2})s'_n(iT)+jb_n c_n(iT) \quad \text{EQUATION (17)}$$

Therefore, depending on whether the sample number is odd or even, a different output can be generated by modulator 16A. Given that the LUT is now half its original size, a particular output of the LUT still needs to be mapped based on how the data would have looked if the full LUT had been used. To do this, the even and odd numbered symbols can be used to generate a set of control signal then based on the sign of $\alpha_{n+2}$, and a final decision regarding the particular output can be made.

In particular, control signals generated by mapping logic 32A of modulator 16A can be used to track whether a sample is odd or even. In the implementation illustrated in FIG. 3, four control signals are generated, although other implementations may use more or fewer control signals.

For example, control signals $p_n$ and $q_n$ identifying the signs of $b_n$ and $a_n$ respectively may be generated when the terms are non-zero. The term $a_n$ is computed once every two symbols (even symbols) and the term $b_n$ is also computed once every two symbols (odd symbols). Thus, computation of terms $b_n$ and $a_a$ alternate, depending on whether the current symbol is an even numbered symbol or an odd numbered symbol.

Additional control signals can also be generated by mapping logic 32A to indicate the signs of the $a_n\alpha_{n+2}$ and $-b_n\alpha_{n+2}$ terms of EQUATIONS (16) and (17). In particular, control signals $u_n$ and $v_n$ may respectively indicate the signs of $a_n\alpha_{n+2}$ and $-b_n\alpha_{n+2}$. In order to ensure that $b_n$ and $a_n$ are non-zero control signals $q_n$ and $u_n$ are used for even numbered samples and control signals $p_n$ and $v_n$ are used for odd numbered samples.

Table 1, below, is a logic table that can be used to form the respective control signals. Numerous other implementations, however, could also be used. As an example, the control signal $q_n$ is formed by considering first the differentially encoded current data symbol $d_{n+2}$ and control signal $p_{n-1}$. The term $a_n$ can be formed using EQUATION (10), where $q_n$ represents the sign of $a_n$ in EQUATION (10).

TABLE 1

| $d_{n+2}$ | $p_{n-1}$ | $\alpha_{n+2}$ | $b_n$ | $a_n$ | $-\alpha_{n+2}$ $b_{n-1}$ | $-\alpha_{n+2} a_{n-1}$ | $u_n$ | $v_n$ | $p_n$ | $q_n$ |
|---|---|---|---|---|---|---|---|---|---|---|
| 0 | 0 | 1 | 1 | 1 | -1 | -1 | 0 | 1 | 0 | 1 |
| 0 | 1 | 1 | -1 | -1 | 1 | 1 | 1 | 0 | 1 | 0 |
| 1 | 0 | -1 | 1 | 1 | 1 | 1 | 1 | 0 | 1 | 0 |
| 1 | 1 | -1 | -1 | -1 | -1 | -1 | 0 | 1 | 0 | 1 |

The control signal entries of Table 1 can be formed in terms of $d_{n+2}$, $p_n$, $q_n$, $p_{n-1}$, and $q_{n-1}$, as:

$$q_n = d_{n-2} \oplus p_{n-1} \qquad \text{EQUATION (18)}$$

$$p_n = d_{n-2} \oplus q_{n-1} \qquad \text{EQUATION (19)}$$

$$v_n = d_{n+2} \oplus p_n \qquad \text{EQUATION (20)}$$

$$u_n = d_{n+2} \oplus q_n \qquad \text{EQUATION (21)},$$

where the symbol $\oplus$ represents the exclusive OR operation.

As a result the modulated signal of EQUATIONS (16) and (17) can be reduced to:

for even numbered symbols:

$$\exp j\Theta(t) = (1-2q_n)c_n(I_n) + j(1-2u_n)s_n(I_n), \text{ and} \qquad \text{EQUATION (22)}$$

for odd numbered symbols:

$$\exp j\Theta(t) = (1-2v_n)s_n(I_n) + j(1-2p_n)c_n(I_n) \qquad \text{EQUATION (23)}$$

Figure 3:
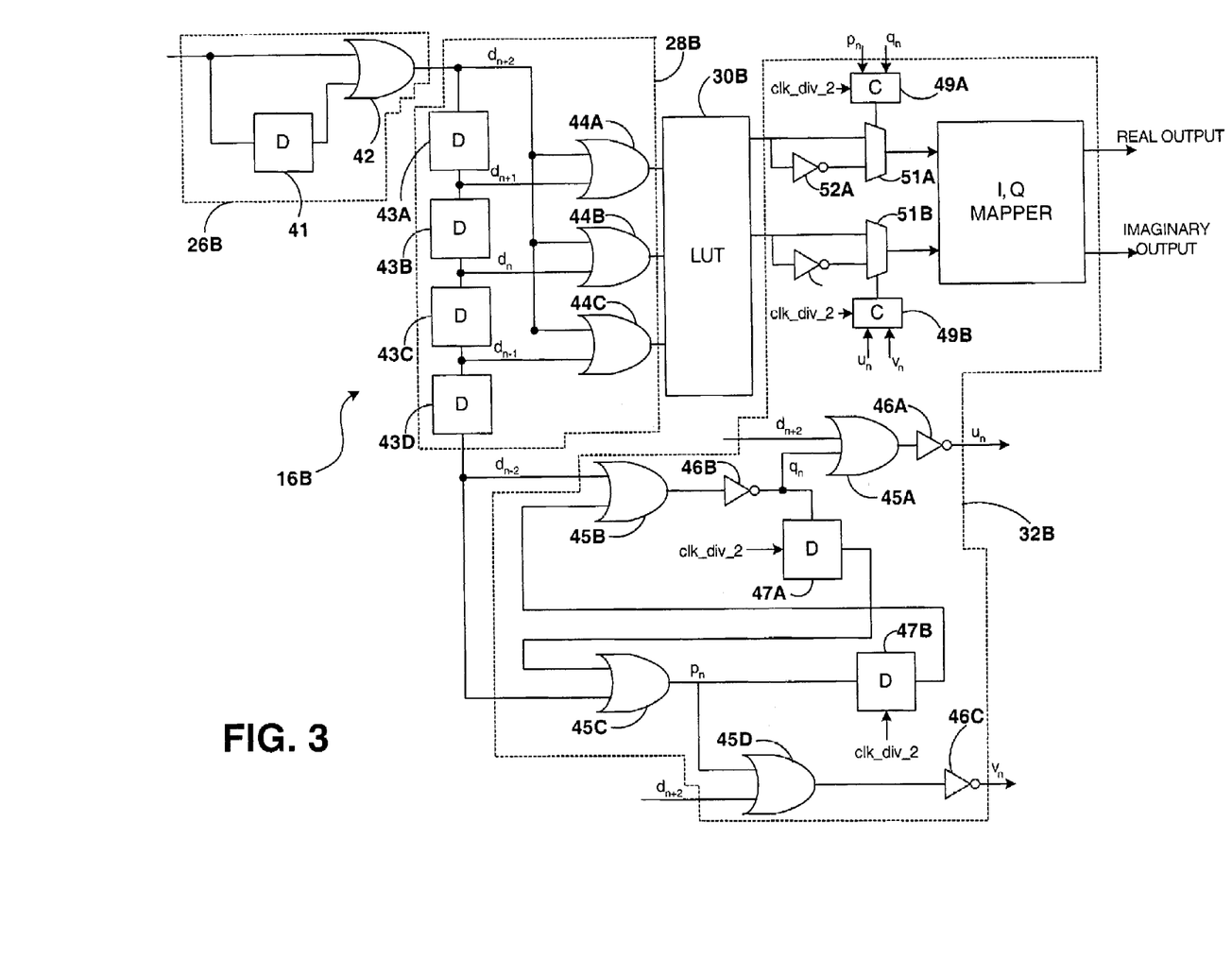
FIG. 3 is a circuit diagram illustrating one exemplary implementation of a digital GMSK modulator according to this disclosure.

FIG. 3 is a circuit diagram illustrating one exemplary implementation of a digital GMSK modulator 16B according to this disclosure exploiting the mathematical framework outlined above. Numerous other implementations could also be designed in accordance with the teaching of this disclosure. In this case, modulator 16B may correspond to modulator 16A of FIG. 2 or modulator 16 of FIG. 1, although as mentioned, numerous other implementations could also be used. As illustrated in FIG. 3, modulator 16B includes a differential encoder 26B, delay circuitry 28B, a lookup table (LUT) 30B and mapping logic 32B.

Differential encoder 26B receives an input bit stream 27B, and differentially encodes bit stream 27B, e.g., according to the GSM standard. In the exemplary embodiment of FIG. 3, differential encoder 26B comprises a one-cycle delay circuit 41 and OR gate 42.

The differentially encoded bit stream is received by delay circuitry 28B, which provides samples to LUT 30B and mapping circuitry 32B in a delayed and coordinated manner in order to introduce intersymbol interdependence in the waveform being created. In particular, delay circuitry 28B may include a set of one-cycle delay circuits 43A–43D and a set of OR gates 44A–44C. A current symbol $(d_{n+2})$ and each of the three previous symbols $(d_{n+1})$, $(d_n)$ and $(d_{n-2})$ may feed into respective OR gates 44A–44C. By clocking the bit stream in this manner, intersymbol interdependence can be introduced.

In addition, the current symbol $(d_{n+2})$, and the symbol that precedes the current symbol by four cycles $(d_{n-2})$ are input to mapping logic 32B in order to facilitate generation of control signals $u_n$, $v_n$, $p_n$ and $q_n$. In the illustrated example of FIG. 3, mapping logic 32B includes a set of OR gates 45A–45C, a set of inverters 46A–46C, and a set of two-cycle delay circuits 47A–47B. OR gate 45A receives current symbol $(d_{n+2})$ and control signal $q_n$ as input. Inverter 46A inverts the output of OR gate 45A to generate control signal $u_n$.

OR gate 45B receives as input the symbol that precedes the current symbol by four cycles $(d_{n-2})$ and a two-clock cycle delayed value of control signal $p_n$. Delay circuit 47B stores the output of OR gate 45C (control signal $p_n$) from two cycles earlier. Inverter 46B inverts the output of OR gate 45B to generate control signal $q_n$.

OR gate 45C receives as input the symbol that precedes the current symbol by four cycles $(d_{n-2})$ and a two-clock cycle delayed value of control signal $q_n$. Delay circuit 47A stores the output of inverter 46B (control signal $q_n$) from two cycles earlier. The output of OR gate 45C defines control signal $p_n$.

OR gate 45D receives as input the current symbol $(d_{n+2})$ and the output of OR gate 45C, i.e., control signal $p_n$. Inverter 46C inverts the output of OR gate 45D to generate control signal $v_n$.

Two cycle delay circuits 47A and 47B are clocked in an alternating manner such that control signals $q_n$ and $u_n$ are generated and used for even numbered samples and control signals $p_n$ and $v_n$ are generated and used for odd numbered samples. In the illustrated example of FIG. 3, these respective control signals $u_n$, $v_n$, $p_n$ and $q_n$ are input to control logic circuits 49A, 49B. Control logic circuits 49A, and 49B, in turn, provide control signals to multiplexers 51A, 51B to facilitate selection of the output of LUT 30B and an inverted output of LUT 30B.

LUT 30B stores a subset of GMSK waveforms. Mapping logic 32B exploits redundancy in GMSK modulation so that only a subset, e.g., one-half, of all possible GMSK waveforms are stored in LUT 30B. The selection of a GMSK waveform is performed by LUT 30B based on the differentially encoded input bit stream, which is provided to LUT 30B by delay circuitry 28B as outlined above.

The selections from LUT 30B are provided to multiplexers 51A, 51B. In addition, inverters 52A and 52B invert the waveforms selected from LUT 30B, and provide the inverted waveforms to multiplexers 51A, 51B. Control logic circuits 49A, and 49B use control signals $u_n$, $v_n$, $p_n$ and $q_n$ in order to control multiplexers 51A, 51B and facilitate selection between the direct outputs of LUT 30B and inverted outputs of LUT 30B. Such logic exploits redundancy in the GMSK modulation scheme such that the size of LUT 30B can be reduced by one-half, e.g., avoiding storage of entries that are the inverted waveforms of other entries stored in LUT 30B. Ultimately, control signals $u_n$, $v_n$, $p_n$ and $q_n$ generated by mapping logic 32B facilitate selection of either a direct or inverted output of LUT 30B in order to reduce memory requirements in modulator 16B.

The output of multiplexers 51A and 51B may comprise the desired GMSK waveforms for respective real and imaginary components of a complex baseband waveform. I, Q mapper 55 may receive the output waveforms from multiplexers 51A and 51B and map the respective outputs to real (I) and imaginary (Q) components of the complex waveforms. The output of I, Q mapper 55 may include real and imaginary output that collectively comprises a complex waveform corresponding to a desired baseband signal. For example, I, Q mapper 55 may assign selected GMSK waveforms as real (I) and imaginary (Q) components of the complex waveform based on whether the current symbol is an even or odd numbered symbol. I, Q mapper 55 may include counters to track whether the current symbol is an even or odd numbered symbol, or may receive control signals similar to control signals like $u_n$, $v_n$, $p_n$ and $q_n$ in order to coordinate such mapping to create a complex waveform.

Figure 4:
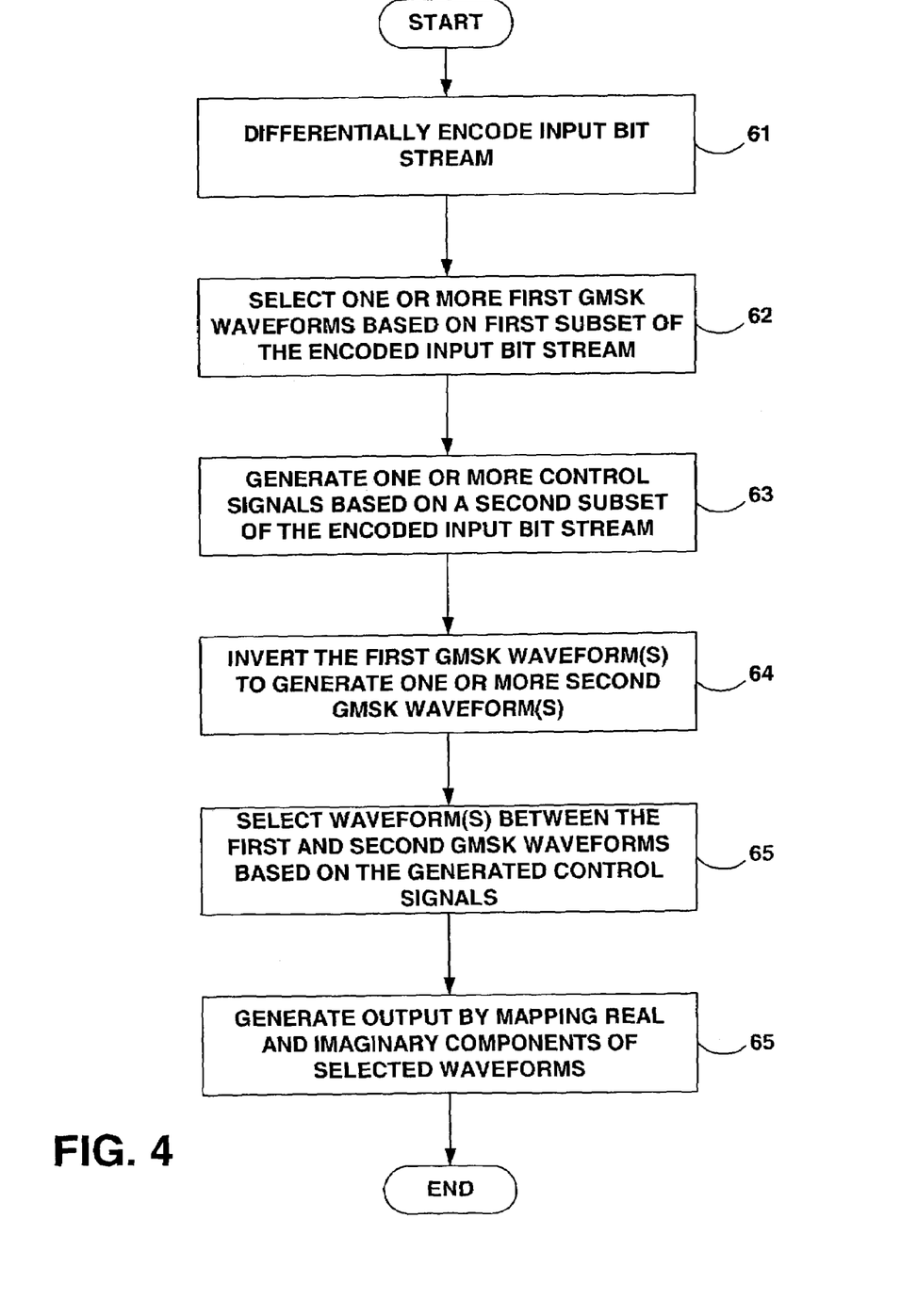
FIG. 4 is a flow diagram illustrating a digital implementation of a GMSK modulation technique.

FIG. 4 is flow diagram illustrating a GMSK modulation technique implemented in a digital realm. By way of example, FIG. 4 will be described from the perspective of modulator 16A of FIG. 2. A number of different implementations of modulator 16A are possible, including the implementation of modulator 16B illustrated in FIG. 3.

Differential encoder 26A differentially encodes input bit stream 27, e.g., according to the GSM standard (61). LUT 30A is used to select one or more GMSK waveforms based on a first subset of the differentially encoded input bit stream (62). For example, delay circuitry 28A may define the first subset of the input bit stream that is fed into LUT 30A in a manner that introduces intersymbol interdependence. Selection from LUT 30A is based on the input form delay circuitry 28A, i.e., the first subset of the input bit stream. In addition, delay circuitry 28A may define a second subset of the input bit stream, which is fed into mapping logic 32A.

Mapping logic 32A generates one or more control signals based on the second subset of the encoded bit stream (63), e.g., defined by delay circuitry 28A. In addition, mapping logic 32A receives one or more first GMSK waveforms selected from LUT 30A, and inverts the first GMSK waveforms to generate second GMSK waveforms (64). Accordingly, LUT 30A does not need to store every possible GMSK waveform entry, but rather, can store approximately one-half of the possible entries. The remaining entries can be generated by inverting selected entries as described herein. Such a technique can significantly reduce memory requirements in GMSK modulator 16A.

After mapping logic 32A inverts the first GMSK waveforms received from LUT 30A, to generate second GMSK waveforms, mapping logic 32A selects between the first and second waveforms based on the generated control signals (65). In other words, mapping logic 32A inverts the output of LUT 30A, generates control signals based on a subset of the input bit stream, and then selects between the output of LUT 30A and the inverted output of LUT 30A using the control signals. At this point, however, modulator 16A may still need to assign selected output waveforms as being either real or imaginary components of a complex waveform, i.e., the baseband signal. Accordingly, mapping logic also performs such real (I) and imaginary (Q) mapping of the waveforms to generate the desired output, i.e., a complex baseband signal (66). The digitally generated complex GMSK baseband signal may then be converted to analog, mixed on a carrier wave, and then transmitted via a wireless communication protocol.

A number of embodiments of a digital GMSK modulator have been described. For example, a digital GMSK modulator including a LUT and mapping logic has been described, which takes advantage of redundancy in GMSK modulation to reduce the amount of memory used by the LUT. A mathematical explanation of the generation and use of control signals to advantageously exploit such redundancy in the GMSK modulation has also been provided. Nevertheless, various modifications may be made without departing from the spirit and scope of this disclosure. These and other embodiments are within the scope of the following claims.

The invention claimed is:

1. A method comprising:
   selecting a plurality of first Gaussian minimum shift keying (GMSK) waveforms from a lookup table (LUT) based on a first subset of an input bit stream;
   generating a plurality of control signals based on a second subset of the input bit stream; and
   generating a plurality of output GMSK waveforms based on the plurality of first GMSK waveforms and the plurality of control signals.

2. The method of claim 1, further comprising:
   forming an L-bit value based on the first subset of the input bit stream, where L is greater than one, and wherein the plurality of first GMSK waveforms comprise a sine of the L-bit value and a cosine of the L-bit value.

3. The method of claim 1, further comprising:
   generating a wireless signal based on the plurality of output GMSK waveforms; and
   transmitting the wireless signal according to a wireless communication protocol.

4. The method of claim 1, further comprising:
   differentially encoding the input bit stream, wherein the selecting the plurality of first GMSK waveforms comprises selecting the plurality of first GMSK waveforms based on a first subset of the differentially encoded input bit stream, and wherein the generating the plurality of control signals comprises generating the plurality of control signals based on a second subset of the differentially encoded input bit stream.

5. The method of claim 1, wherein the generating the plurality of control signals comprises
   generating a first subset of the plurality of control signals based on the second subset of the input bit stream for odd numbered input bits, and
   generating a second subset of the plurality of control signals based on the second subset of the input bit stream for even numbered input bits.

6. The method of claim 1, wherein the second subset of the input bit stream comprises at least one input bit not included in the first subset of the input bit stream.

7. The method of claim 1, further comprising:
   generating real and imaginary components of a complex waveform based on the plurality of output GMSK waveforms.

8. An apparatus comprising:
   a lookup table (LUT) that maps subsets of an input bit stream to Gaussian minimum shift keying (GMSK) waveforms, the LUT outputting a plurality of first GMSK waveforms based on a first subset of the input bit stream; and
   mapping logic to generate a plurality of control signals based on a second subset of the input bit stream and to generate a plurality of output GMSK waveforms based on the plurality of first GMSK waveforms and the plurality of control signals.

9. The apparatus of claim 8, further comprising:
   delay circuitry to form the first and second subsets of the input bit stream.

10. The apparatus of claim 8, further comprising:
    a differential encoder to differentially encode the input bit stream, wherein the first and second subsets of the input bit stream are first and second subsets of the differentially encoded input bit stream.

11. The apparatus of claim 9, wherein the delay circuitry further forms an L-bit value based on the first subset of the input bit stream, where L is greater than one, and wherein the plurality of first GMSK waveforms comprise a sine of the L-bit value and cosine of the L-bit value.

12. The apparatus of claim 8, wherein the mapping logic generates a first subset of the plurality of control signals based on the second subset of the input bit stream for odd numbered input bits and generates a second subset of the plurality of control signals based on the second subset of the input bit stream for even numbered input bits.

13. The apparatus of claim 11, wherein the second subset of the input bit stream comprises at least one input bit not included in the first subset of the input bit stream.

14. The apparatus of claim 11, wherein the delay circuitry provides the L-bit value as an address for the LUT, and wherein L is selected to reduce memory size of the LUT by at least one half.

15. The apparatus of claim 8, wherein the mapping logic generates real and imaginary components of a complex waveform based on the plurality of output GMSK waveforms.

16. The apparatus of claim 8, wherein the mapping logic selectively inverts each of the plurality of first GMSK waveforms based on a respective subset of the plurality of control signals to generate a corresponding one of the plurality of output GMSK waveforms.

17. The apparatus of claim 8, wherein the plurality of first GMSK waveforms comprise an inphase GMSK waveform and a quadrature GMSK waveform, wherein the mapping logic generates real and imaginary components of a complex waveform based on the inphase and quadrature GMSK waveforms, respectively, for odd numbered input samples and generates the real and imaginary components based on the quadrature and inphase GMSK waveforms, respectively, for even numbered input samples.

18. A wireless communication device comprising:
a digital Gaussian minimum shift keying (GMSK) modulator including:
a lookup table (LUT) that maps subsets of an input bit stream to GMSK waveforms, the LUT outputting a plurality of first GMSK waveforms based on a first subset of the input bit stream, and
mapping logic to generate a plurality of control signals based on a second subset of the input bit stream and to generate a plurality of output GMSK waveforms based on the plurality of first GMSK waveforms and the plurality of control signals;
a digital-to-analog (D/A) converter to convert the plurality of output GMSK waveforms to an analog signal; and
a transmitter to transmit the analog signal.

19. The wireless communication device of claim 18, wherein the transmitter mixes the analog signal on a carrier and transmits the carrier mixed with the analog signal using a wireless communication protocol.

20. The wireless communication device of claim 18, further comprising:
a user interface to receive information from a user, and
an encoder to encode the information as the input bit stream and provide the input bit stream to the GMSK modulator.

21. The wireless communication device of claim 18, the GMSK modulator further comprising delay circuitry to define the first and second subsets of the input bit stream.

22. The wireless communication device of claim 18, the GMSK modulator further comprising a differential encoder to differentially encode the input bit stream, wherein the first and second subsets of the input bit stream are first and second subsets of the differentially encoded input bit stream.

23. The wireless communication device of claim 21, wherein the delay circuitry forms an L-bit value based on the first subset of the input bit stream, where L is greater than one, and wherein the plurality of first GMSK waveforms comprise a sine of the L-bit value and a cosine of the L-bit value.

24. The wireless communication device of claim 18, wherein the mapping logic generates a first subset of the plurality of control signals based on the second subset of the input bit stream for odd numbered input bits and generates a second subset of the plurality of control signals based on the second subset of the input bit stream for even numbered input bits.

25. The wireless communication device of claim 18, wherein the second subset of the input bit stream comprises at least one input bit not included in the first subset of the input bit stream.

26. The wireless communication device of claim 18, wherein the mapping logic generates real and imaginary components of a complex waveform based on the plurality of output GMSK waveforms, and wherein the D/A converter converts the complex waveform to the analog signal.

27. An apparatus comprising:
means for generating a plurality of first Gaussian minimum shift keying (GMSK) waveforms based on a subset of an input bit stream;
means for generating a plurality of control signals based on a second subset of the input bit stream; and
means for generating a plurality of output GMSK waveforms based on the plurality of first GMSK waveforms and the plurality of control signals.

28. The apparatus of claim 27, wherein the means for generating the plurality of output GMSK waveforms comprises
means for selectively inverting each of the plurality of first GMSK waveforms based on a respective subset of the plurality of control signals to generate a corresponding one of the plurality of output GMSK waveforms.

29. The apparatus of claim 27, further comprising:
means for differentially encoding the input bit stream, wherein the first and second subsets of the input bit stream are first and second subsets of the differentially encoded input bit stream.

30. The apparatus of claim 27, further comprising:
means for forming an L-bit value based on the first subset of the input bit stream, where L is greater than one, and wherein the plurality of first GMSK waveforms comprise a sine of the L-bit value and a cosine of the L-bit value.

31. The apparatus of claim 27, further comprising:
means for generating real and imaginary components of a complex waveform based on the plurality of output GMSK waveforms.

32. The apparatus of claim 27, wherein the means for generating the plurality of control signals comprises
means for generating a first subset of the plurality of control signals based on the second subset of the input bit stream for odd numbered input bits, and
means for generating a second subset of the plurality of control signals based on the second subset of the input bit stream for even numbered input bits.

* * * * *